(12) United States Patent
Jo

(10) Patent No.: US 12,382,137 B2
(45) Date of Patent: Aug. 5, 2025

(54) DISPLAY DEVICE AND CONTROLLING METHOD OF DISPLAY DEVICE

(71) Applicant: SAMSUNG ELECTRONICS CO., LTD., Suwon-si (KR)

(72) Inventor: Yeji Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 60 days.

(21) Appl. No.: 17/982,784

(22) Filed: Nov. 8, 2022

(65) Prior Publication Data

US 2023/0060986 A1 Mar. 2, 2023

Related U.S. Application Data

(63) Continuation of application No. PCT/KR2022/012611, filed on Aug. 24, 2022.

(30) Foreign Application Priority Data

Aug. 24, 2021 (KR) .................. 10-2021-0111929

(51) Int. Cl.
*H04N 21/482* (2011.01)
*H04N 21/426* (2011.01)
(Continued)

(52) U.S. Cl.
CPC ..... *H04N 21/472* (2013.01); *H04N 21/42607* (2013.01); *H04N 21/462* (2013.01); *H04N 21/47217* (2013.01)

(58) Field of Classification Search
CPC ........... H04N 21/42607; H04N 21/462; H04N 21/47217; H04N 21/23418;
(Continued)

(56) References Cited

U.S. PATENT DOCUMENTS 8,661,493 B2 2/2014 Wang et al.
10,299,006 B2 5/2019 Thomas et al.
(Continued)

FOREIGN PATENT DOCUMENTS

KR 10-2007-0016277 2/2007
KR 10-2008-0065162 7/2008
(Continued)

OTHER PUBLICATIONS

Search Report dated Dec. 12, 2022 in corresponding International Application No. PCT/KR2022/012611.
(Continued)

*Primary Examiner* — John R Schnurr
(74) *Attorney, Agent, or Firm* — Nixon & Vanderhye, P.C.

(57) ABSTRACT

An example display device includes a display; a memory configured to store a plurality of applications that provide a content playback service; and a processor configured to: store information on the plurality of applications, information on a plurality of contents, and information on a point of time when playback is stopped in the memory when the playback of the plurality of contents played through the plurality of applications is stopped, and display a user interface (UI) screen for playing the plurality of contents from the point of time when the playback is stopped on the display using the information stored in the memory, when an application that provides a continuous content playback service is executed.

5 Claims, 19 Drawing Sheets

(51) Int. Cl.
*H04N 21/462* (2011.01)
*H04N 21/472* (2011.01)

(58) Field of Classification Search
CPC ......... H04N 21/2387; H04N 21/42661; H04N 21/42692; H04N 21/4316; H04N 21/44008; H04N 21/4622; H04N 21/472; H04N 21/482; H04N 21/61; H04N 21/6125; H04N 21/81; H04N 21/8173
See application file for complete search history.

(56) References Cited

U.S. PATENT DOCUMENTS

| | | |
|---|---|---|
| 2005/0094031 A1 | 5/2005 | Tecot et al. |
| 2007/0033619 A1 | 2/2007 | Han et al. |
| 2008/0134256 A1* | 6/2008 | DaCosta .......... H04N 21/43615 348/E7.071 |
| 2013/0081088 A1 | 3/2013 | Hwang et al. |
| 2013/0159933 A1 | 6/2013 | Bae et al. |
| 2013/0326569 A1 | 12/2013 | Kuo et al. |
| 2014/0130114 A1 | 5/2014 | Hwang et al. |
| 2015/0227290 A1 | 8/2015 | Lewis et al. |
| 2016/0328105 A1 | 11/2016 | Chandra et al. |
| 2018/0063591 A1* | 3/2018 | Newman ................ H04N 21/44 |
| 2018/0113579 A1* | 4/2018 | Johnston .......... H04N 21/47217 |
| 2019/0045271 A1* | 2/2019 | Christie ................ H04N 21/431 |
| 2020/0359059 A1* | 11/2020 | Zhang ................ H04N 21/6143 |

FOREIGN PATENT DOCUMENTS

| | | |
|---|---|---|
| KR | 10-2011-0012220 | 2/2011 |
| KR | 10-2012-0058062 | 6/2012 |
| KR | 10-1479403 | 1/2015 |
| KR | 10-1784004 | 10/2017 |
| KR | 10-2018-0002702 | 1/2018 |
| KR | 10-1887506 | 8/2018 |

OTHER PUBLICATIONS

Written Opinion dated Dec. 12, 2022 in corresponding International Application No. PCT/KR2022/012611.
Extended Search Report dated Sep. 3, 2024 in European Patent Application No. 22861696.7.

* cited by examiner

FIG. 4B

DATA SET OF CONTENT WHOSE REPRODUCTION IS STOPPED ~121

| CLASSIFICATION | APPLICATION | CONTENT ID | POINT OF TIME WHEN REPRODUCTION IS STOP | CONTENT TITLE | CONTENT IMAGE |
|---|---|---|---|---|---|
| 1 | A | 1x34od902e | (23:50/2:00:00) | EPISODE X-10 | XXX-10.jpg |
| 2 | B | 452vwf149a | (1:05:50/1:30:00) | EPISODE Y-1 | YYY-1.jpg |
| 3 | B | gkb1125ota | (1:25:05/1:30:00) | EPISODE Y-2 | YYY-2.jpg |
| 4 | C | gla12emfdj | (1:37:28/2:00:00) | Z | ZZZ.jpg |
| 5 | D | 43wnr9wkrh | (2:17:42/3:30:00) | S | SSS.jpg |
| ... | ... | ... | ... | ... | |

FIG. 10B

DATA SET OF BROADCAST CONTENT WHOSE REPRODUCTION IS STOPPED ~123

| CLASSIFICATION | NAME OF CHANNEL | POINT OF TIME WHEN REPRODUCTION IS STOPPED | CONTENT TITLE | CONTENT IMAGE |
|---|---|---|---|---|
| 1 | 001 | (33:50/1:00:00) | EPISODE Q-1 | QQQ-1.jpg |
| 2 | 003 | (0:10:50/0:40:00) | EPISODE W-5 | WWW-5.jpg |
| 3 | 023 | (1:10:20/1:20:00) | E | EEE.jpg |
| 4 | 041 | (1:47:00/2:00:00) | R | RRR.jpg |
| 5 | 135 | (0:42:40/2:30:00) | EPISODE T-9 | TTT-9.jpg |
| ... | ... | ... | ... | |

1031-1, 1031-2

DATA SET OF CONTENT PROVIDED FROM APPLICATION ~124

| CLASSIFICATION | APPLICATION A | APPLICATION B | APPLICATION C | APPLICATION D |
|---|---|---|---|---|
| 1 | EPISODE Q-1 | EPISODE W-1 | EPISODE X-1 | EPISODE Y-1 |
| 2 | EPISODE Q-2 | EPISODE W-2 | EPISODE X-2 | EPISODE Y-2 |
| 3 | EPISODE Q-3 | EPISODE W-3 | Z | EPISODE Y-3 |
| 4 | EPISODE Q-4 | Z | Y | EPISODE T-1 |
| 5 | EPISODE Q-5 | Y | R | EPISODE T-2 |
| ... | ... | ... | ... | |

1022-1, 1021, 1022, 1022-2

DISPLAY DEVICE AND CONTROLLING METHOD OF DISPLAY DEVICE

CROSS-REFERENCE TO RELATED APPLICATION(S)

This application is a bypass continuation of International Application No. PCT/KR2022/012611, filed on Aug. 24, 2022, which is based on and claims priority to Korean Patent Application No. 10-2021-0111929, filed on Aug. 24, 2021, in the Korean Intellectual Property Office, the disclosures of which are incorporated by reference herein in their entireties.

BACKGROUND

1. Field

The disclosure relates to a display device and a controlling method of a display device, and more particularly, to a display device capable of continuously viewing content whose playback is stopped, and a controlling method of the display device.

2. Description of the Related Art

As an over-the-top (OTT) media service has recently become popular, contents provided through the OTT media service may be watched through an OTT media service application through various display devices. In addition, when the display device is a smart TV, it is possible to watch broadcast content provided through a broadcast channel as well as the content provided through the OTT media service.

On the other hand, when the user stops watching the content provided through the OTT media service, the user has to remember the OTT media service application that provided the content that the user has stopped watching, as well as the content, to continue watching the content that the user has stopped watching.

In addition, when the user stops watching broadcast content provided through a broadcast channel, there is an inconvenience in that the user has to find a channel or OTT media service that broadcasts the broadcast content that the user has stopped watching to continue watching the broadcast content that the user has stopped watching.

Accordingly, for the convenience of the user of the display device, it is necessary to allow the user to continue watching a selected content only by displaying the content or broadcast content that the user has stopped watching on one screen and selecting the displayed content.

SUMMARY

Embodiments of the disclosure provide a display apparatus capable of continuously playing content of which play back is stopped based on information on the content and information on a play back time point at which play back is stopped, and a method for controlling thereof.

According to an example embodiment, a display device includes a display; a memory configured to store a plurality of applications that provide a content playback service; and a processor configured to: store information on the plurality of applications, information on a plurality of contents, and information on a point of time when playback is stopped in the memory when the playback of the plurality of contents played through the plurality of applications is stopped, and display a user interface (UI) screen for playing the plurality of contents from the point of time when the playback is stopped on the display, using the information stored in the memory when an application that provides a continuous content playback service is executed.

The processor may be configured to: execute an application in which selected content is played among the plurality of applications when a user command for selecting one of the plurality of contents is input through the UI screen, and play the selected content from the point of time when the playback is stopped through the executed application using information on the selected content and information on the point of time when the playback of the selected content is stopped.

Each of the plurality of applications may be an application that provides a service for streaming content stored in a server to the display device through an Internet network.

The processor may be configured to: store information on broadcast content and information on a watching time of the broadcast content in the memory when a user command for stopping displaying the broadcast content is input while the broadcast content provided through a channel is displayed on the display, and display the UI screen for providing the broadcast content after the watching time on the display based on the information on the broadcast content and the information on the watching time of the broadcast content when the application that provides the continuous content playback service is executed.

The processor may be configured to: identify an application that provides the broadcast content among the plurality of applications based on information on content provided from each of the plurality of applications and the information on the broadcast content when the application that provides the continuous content playback service is executed, display the UI screen including the information on the broadcast content provided from the identified application on the display, and execute the identified application when a user command for selecting the broadcast content is input through the UI screen and play the broadcast content after the watching time through the executed application using the information on the watching time of the broadcast content.

The processor may be configured to: identify a channel providing broadcast content after the watching time among a plurality of channels based on information on broadcast schedules of the plurality of channels, the information on the broadcast content, and the information on the watching time of the broadcast content when the application that provides the continuous content playback service is executed, display the UI screen including the information on the broadcast content provided from the identified channel on the display, and display the broadcast content provided through the identified channel on the display when a user command for selecting the broadcast content is input through the UI screen.

The processor may be configured to: identify a channel providing content after the point of time when the playback is stopped among a plurality of channels based on information on broadcast schedules of the plurality of channels, the information on the plurality of contents, and the information on the point of time when the playback is stopped when the application that provides the continuous content playback service is executed, and display the UI screen for displaying the content provided from the identified channel on the display.

The processor may be configured to: display the UI screen including information on the identified channel on the display, and display the content provided through the identified channel on the display when a user command for selecting the content is input through the UI screen.

According to an embodiment, a controlling method of a display device includes storing, in a memory of the display device, information on a plurality of applications, information on a plurality of contents, and information on a point of time when playback is stopped in the memory when the playback of the plurality of contents played through the plurality of applications is stopped, and displaying a user interface (UI) screen for playing the plurality of contents from the point of time when the playback is stopped using the information stored in the memory when an application that provides a continuous content playback service is executed.

The controlling method may further include executing an application in which selected content is played among the plurality of applications when a user command for selecting one of the plurality of contents is input through the UI screen, and playing the selected content from the point of time when the playback is stopped through the executed application using information on the selected content and information on a playback time point when playback of the selected content is stopped.

Each of the plurality of applications may be an application that provides a service for streaming content stored in a server to the display device through an Internet network.

In the storing of the information, information on broadcast content and information on a watching time of the broadcast content may be stored in the memory when a user command for stopping displaying the broadcast content is input while the broadcast content provided through a channel is displayed, and in the displaying of the UI screen, the UI screen for providing the broadcast content after the watching time may be displayed based on the information on the broadcast content and the information on the watching time of the broadcast content when the application that provides the continuous content playback service is executed.

The displaying of the UI screen may include identifying an application that provides the broadcast content among the plurality of applications based on information on content provided from each of the plurality of applications and the information on the broadcast content when the application that provides the continuous content playback service is executed, and displaying the UI screen including the information on the broadcast content provided from the identified application, and the controlling method may include executing the identified application when a user command for selecting the broadcast content is input through the UI screen, and playing the broadcast content after the watching time through the executed application using the information on the watching time of the broadcast content.

The displaying of the UI screen may include identifying a channel providing broadcast content after the watching time among a plurality of channels based on information on broadcast schedules of the plurality of channels, the information on the broadcast content, and the information on the watching time of the broadcast content when the application that provides the continuous content playback service is executed, and displaying the UI screen including the information on the broadcast content provided from the identified channel, and the controlling method may include displaying the broadcast content provided through the identified channel when a user command for selecting the broadcast content is input through the UI screen.

The displaying of the UI screen may include identifying a channel providing content after the point of time when the playback is stopped among a plurality of channels based on information on broadcast schedules of the plurality of channels, the information on the plurality of contents, and the information on the point of time when the playback is stopped when the application that provides the continuous content playback service is executed, and displaying the UI screen for displaying the content provided from the identified channel.

The displaying of the UI screen may include displaying the UI screen including information on the identified channel, and the controlling method may include displaying the content provided through the identified channel when a user command for selecting the content is input through the UI screen.

According to various embodiments of the disclosure, the convenience for a user to watch content may be secured in that the user may continue watching from the point of time when the playback is stopped through an application or a broadcast channel that stores information on the content whose playback is stopped and information on the point of time when the playback is stopped, and provides the content whose playback is stopped based on the stored information.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 4A, 4B, and 4C are diagrams illustrating an example method of displaying a UI screen for displaying content that has been played in an application according to various embodiments;

FIGS. 10A and 10B are diagrams illustrating an example method of displaying a UI screen for providing broadcast content according to various embodiments;

DETAILED DESCRIPTION

Figure 1:
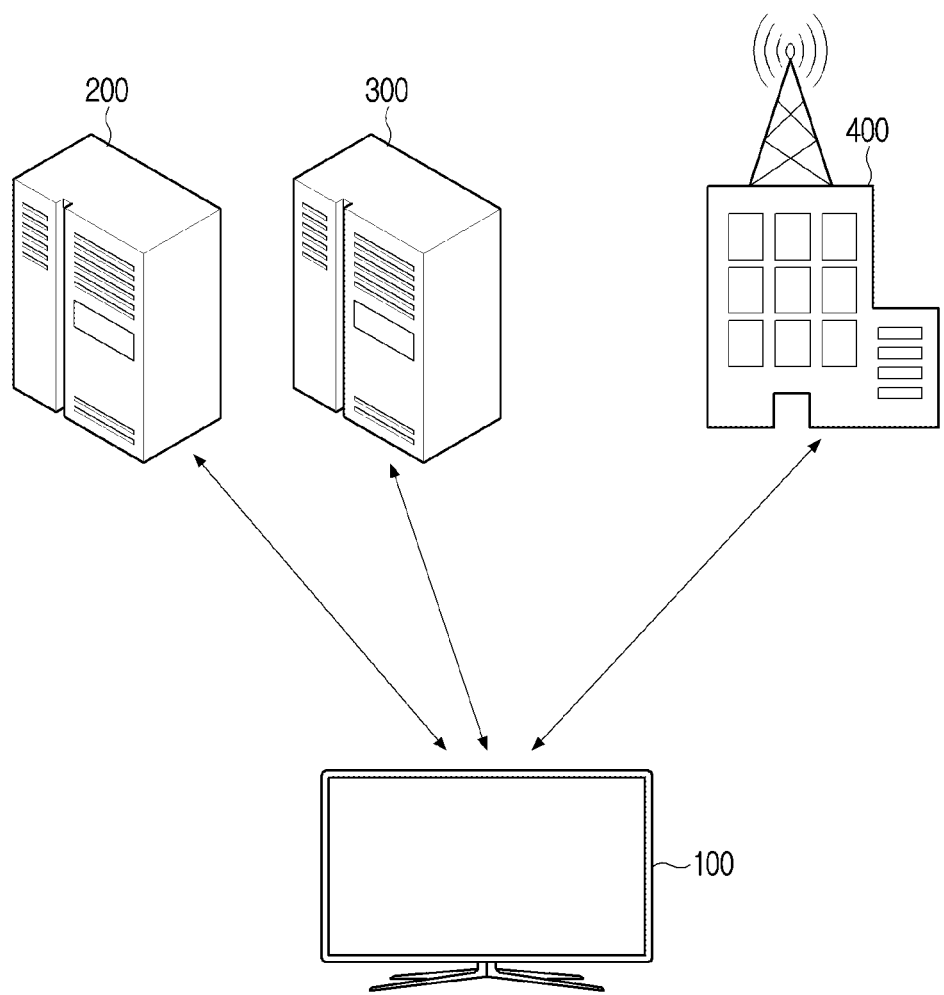
FIG. 1 is a diagram illustrating an example display device according to various embodiments.

Because the embodiments may be variously modified and have several embodiments, specific embodiments will be illustrated in the drawings and described in detail in the detailed description. However, it is to be understood that it is not intended to limit the scope to the specific embodiment, but includes various modifications, equivalents, and/or alternatives according to the embodiments of the disclosure. In connection with the description of the drawings, similar reference numerals may be used for similar components.

In describing the disclosure, when a detailed description for known functions or configurations related to the disclosure may unnecessarily obscure the gist of the disclosure, the detailed description thereof will be omitted.

In addition, the following embodiments may be modified to several different forms, and the scope and spirit of the disclosure are not limited to the following embodiments. Rather, these embodiments make the disclosure thorough and complete, and are provided in order to completely transfer the technical spirit of the disclosure to those skilled in the art.

Terms used in the disclosure are used only to describe specific embodiments and are not intended to be limiting of the scope. Singular expressions include plural expressions unless the context clearly indicates otherwise.

In the disclosure, an expression "have", "may have", "include", "may include", or the like, indicates an existence of a corresponding feature (for example, a numerical value, a function, an operation, a component such as a part, or the like), and does not exclude existence of an additional feature.

In the disclosure, an expression "A or B", "at least one of A and/or B", "one or more of A and/or B", or the like, may include all possible combinations of items listed together. For example, "A or B", "at least one of A and B", or "at least one of A or B" may refer to all cases (1) including at least one A, (2) including at least one B, or (3) including both at least one A and at least one B.

Expressions "first", "second", and the like, used in the disclosure may indicate various components regardless of a sequence and/or importance of the components, are used in order to distinguish one component from the other components, and do not limit the corresponding components.

When it is mentioned that any component (e.g., a first component) is (operatively or communicatively) coupled with/to or is connected to another component (e.g., a second component), it is to be understood that any component may be directly coupled with/to another component or may be coupled with/to another component through the other component (e.g., a third component).

On the other hand, when it is mentioned that any component (e.g., a first component) is "directly coupled with/to" or "directly connected to" to another component (e.g., a second component), it is to be understood that the other component (e.g., a third component) is not present between any component and another component.

An expression "configured (or set) to" used in the disclosure may be replaced by an expression "suitable for", "having the capacity to", "designed to", "adapted to", "made to", or "capable of" depending on a situation. A term "configured (or set) to" may not necessarily mean only "specifically designed to" in hardware.

Instead, in any context, an expression "a device configured to" may mean that the device is "capable of" together with other devices or components. For example, a "processor configured (or set) to perform A, B, and C" may mean a dedicated processor (e.g., an embedded processor) for performing the corresponding operations or a generic-purpose processor (for example, a central processing unit (CPU) or an application processor) that may perform the corresponding operations by executing one or more software programs stored in a memory device.

In the embodiments, a 'module' or a 'unit' may perform at least one function or operation, and be implemented as hardware or software or be implemented as a combination of hardware and software. In addition, a plurality of 'modules' or a plurality of 'unit' may be integrated in at least one module and be implemented as at least one processor except for a 'module' or an 'unit' that needs to be implemented as specific hardware.

Various elements and regions in the drawings are schematically illustrated. Therefore, the technical spirit of the disclosure is not limited by relative sizes or intervals illustrated in the accompanying drawings.

Hereinafter, embodiments of the disclosure will be described in detail with reference to the accompanying drawings so that those skilled in the art to which the disclosure pertains may easily practice the disclosure.

FIG. 1 is a diagram illustrating an example display device according to various embodiments. A display device 100 may be implemented as television (TV), a smartphone, a tablet, and the like.

In this case, the display device 100 may play content. In this case, the content may include images and/or audio. Accordingly, the display device 100 may display the image on the display device 100 (e.g., on a display of the display device) and output the audio through the display device 100 (e.g., via a speaker of the display device).

The content may include content provided through an over-the-top (OTT) media service. Here, the OTT media service may refer, for example, to a service for streaming various contents through the Internet network. In this case, the content may be played through an OTT media service application installed on the display device 100. To this end, as an example, the display device 100 may receive content provided by each OTT media service provider from a first OTT media service server 200 and a second OTT media service server 300.

The content may include broadcast content provided through broadcast channels by providers of various broadcast services, such as terrestrial broadcast, cable broadcast, and satellite broadcast. To this end, the display device 100 may receive broadcast content from a broadcasting station 400 or the like.

The playback of the content being played through the display device 100 may be stopped.

Here, the stopping of playback may include a case in which the content displayed on the display device 100 is changed by the user changing the content being played to another (different) content. In addition, the stopping of playback may include a case in which the content displayed on the display device 100 is no longer displayed for reasons such as the user terminating watching of the content being played.

In this case, when the content whose playback is stopped is content provided through the OTT media service application, the user may continue to watch the stopped content by executing the OTT media service application again (e.g., re-executing the OTT media service). However, in this case, when the user does not clearly remember the corresponding OTT media service application, there may be an inconvenience of executing and checking OTT media service applications installed on the display device 100 until the corresponding OTT media service application is found.

Meanwhile, the content whose playback is stopped may be broadcast content. In that the broadcast content is content that is provided in real time through a broadcast channel, an inconvenience may arise in that the user needs to find a channel and a broadcast time on which the broadcast content whose playback is stopped is broadcasted again, and then watch the corresponding broadcast content again from a point of time when the playback is stopped.

Accordingly, the display device 100 according to various embodiments may, when the playback of content is stopped, store information on the content whose playback is stopped and information on the point of time when the playback is stopped, and, using the stored information, start playing the content again from the point of time at which the playback was stopped. As described above, according to various embodiments, the convenience of the user may be increased in that the user may easily continue to watch the content or broadcast content whose playback is stopped through the application or the broadcast channel.

Figure 2:
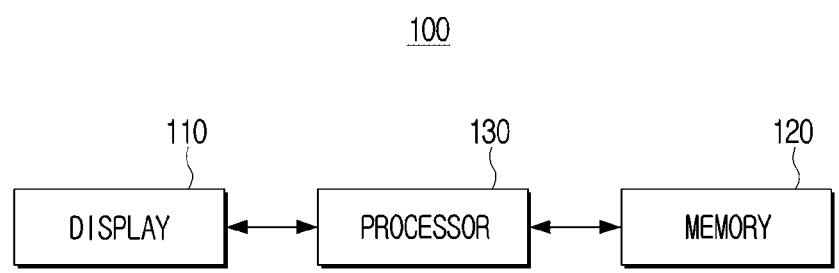
FIG. 2 is a block diagram illustrating a configuration of an example display device according to various embodiments.

FIG. 2 is a block diagram illustrating a configuration of an example display device according to various embodiments. A display 110 may display content. In addition, the display 110 may display a UI screen for an operation of the display device 100.

To this end, the display 110 may be implemented with various types of displays such as a liquid crystal display (LCD), a light emitting diode (LED), or an organic light emitting diode (OLED).

A memory 120 may store data for the operation of the display device 100. In particular, the memory 120 may store various pieces of information necessary to play the content whose playback is stopped from the point of time when the playback is stopped, and a detailed description thereof will be provided later.

In addition, one or more instructions regarding the display device 100 may be stored in the memory 120. The memory 120 may store an operating system (O/S) for driving the display device 100. The memory 120 may also store various software programs or applications for operating the display device 100 according to various embodiments. The memory 120 may include a semiconductor memory such as a volatile memory or a flash memory, or a magnetic storage medium such as a hard disk.

A processor 130 (e.g., including processing circuitry) may be electrically connected to the display 110 and the memory 120 to control an overall operation and function of the display device 100.

The processor 130 may include a central processing unit (CPU) or an application processor (AP), and may execute one or more software programs stored in the memory according to the one or more instructions stored in the memory 120 of the display device 100.

First, the processor 130 may control playing of content. For example, the content may be content provided through the OTT media service application.

In an embodiment, the processor 130 may display a UI screen for executing the OTT media service application stored in the memory 120. In addition, when a user command for selecting one of the OTT media service applications is input, the processor 130 may execute the selected OTT media service application and display an execution screen of the application on the display 110.

In an embodiment, the execution screen of the application may include information (e.g., the name of the content, a thumbnail image, etc.) on a plurality of contents provided through the OTT media service.

Accordingly, when a user command for selecting one content on the execution screen of the application is input, the processor 130 may transmit a command to a server providing the OTT media service for requesting streaming of the selected content. In an embodiment, the display device 100 may include a communication interface (not illustrated) (e.g., including communication circuitry) for communication with the server. In this case, the communication interface (not illustrated) may communicate with the server through a network using various communication methods such as Wi-Fi, 3G, LTE, and the like.

Accordingly, the processor 130 may play the content received from the server. In an embodiment, the content may include images and/or audio. That is, when the image and/or audio are received from the server, the processor 130 may display the image on the display 110 and output the audio through a speaker of the display device 100.

In an embodiment, when the playback of the plurality of contents played through the plurality of applications is stopped, the processor 130 may store, in the memory 120, information on the plurality of applications, information on the plurality of contents, and information on a playback time point at which playback is stopped.

In an embodiment, the stopping of the playback may include ending the content being played, ending an application that plays the content, or changing the content being played to another content. In an embodiment, when a user command for stopping playback is input, the processor 130 may identify that the playback of the content being played through the application is stopped. The user command may be input in various ways, such as, but not limited to, remote control operation, voice recognition, or a touch input to a button provided in the display device 100 or a touch screen included in the display 110.

In an embodiment, each of the plurality of applications may be an application that provides a service for streaming content stored in a server to the display device through an Internet network. That is, the application may be an application that provides the OTT media service.

In addition, information on the application may be information for identifying each of the plurality of applications stored in the memory 120. For example, the information on the application may include, but is not limited to, an application ID and/or a name of the application.

In addition, the information on the content may include, but is not limited to, a content ID, a content title, and/or a content image.

In an embodiment, the content ID is information for identifying each of the plurality of contents provided by the application, and may be assigned by a provider providing the OTT media service.

The information on the content title may include title and episode information of the content. The information on the content image may include URL information of a website that provides a thumbnail image file of the content or a thumbnail image of the content.

In an embodiment, the information on the playback time point at which the playback of the content is stopped may include information on the point of time when the playback of the content is stopped. For example, when a total length of the content is 2 hours and the playback is stopped at 1 hour 20 minutes, the playback time point at which the playback is stopped may include information on a point of time when the playback is currently stopped relative to a total length of the content, for example, (1:20:20/2:00:00) (=(point of time when playback is stopped/total length of content)).

In an embodiment, when the playback of the plurality of contents played through the plurality of applications is stopped, the processor 130 may acquire the information on the applications, the information on the contents, and the information on the playback time point at which the playback is stopped. The processor 130 may store, in the memory 120, the information on the applications, the information on the contents, and the information on the playback time point at which the playback is stopped.

In an embodiment, when the playback of the content being played through the OTT media service application is stopped, the processor 130 may store, in the memory 120, information on the OTT media service application, information on the content whose playback is stopped, and information on a playback time point at which playback is stopped. In this case, the corresponding information may be stored in a data set 121 (See FIG. 3) of the content whose playback is stopped of the memory 120.

Figure 3:
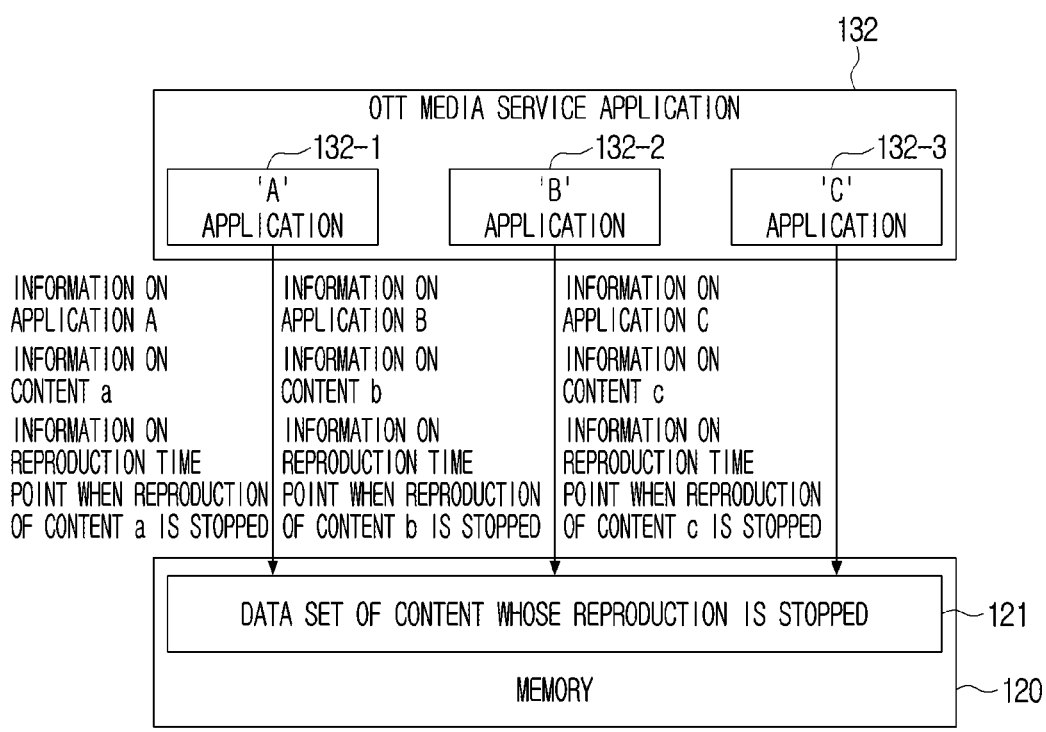
FIG. 3 is a diagram illustrating an example method of storing a content data set whose playback is stopped according to various embodiments.

For example, as illustrated in FIG. 3, a plurality of contents may be played through a plurality of OTT media service applications 132.

In an embodiment, when playback of "a content" being played through an application A 132-1 is stopped, the processor 130 may acquire information on the application A, information on "the a content" and information on a playback time point at which the playback of "the a content" is stopped, and store the acquired information in the data set 121. When playback of "b content" being played through an application B 132-2 is stopped, the processor 130 may acquire information on the application B, information on "the b content", and information on a playback time point at which the playback of "the b content" is stopped, and store the acquired information in the data set 121. When playback of "c content" being played through an application C 132-3 is stopped, the processor 130 may acquire information on the application C, information on "the c content" and information on a playback time point at which the playback of "the c content" is stopped, and store the acquired information in the data set 121.

According to various embodiments, when an application that provides a continuous content playback service is executed, the processor 130 may display, on the display 110, a user interface (UI) screen for playing the plurality of contents from a point of time when the playback is stopped using the information stored in the memory 120. In an embodiment, when a user command for selecting content is input through the UI screen, the processor 130 may display the content selected according to the user command on the display 110 from the point of time when the playback is stopped.

In an embodiment, the application that provides the continuous content playback service (hereinafter, a continuous play application) may refer, for example, to an application for providing recommended content. In this case, the recommended content may include content of a genre frequently watched by the user through the display device 100, content set by the user as a favorite, and the like. In this case, according to an embodiment, the recommended content may include the content whose playback is stopped.

In an embodiment, the processor 130 may display a UI screen for executing the continuous play application stored in the memory 120 on the display 110. In addition, when a user command for selecting the continuous play application is input, the processor 130 may execute the continuous play application.

When the continuous play application is executed, the processor 130 may generate a UI screen through the continuous play application using the information stored in the memory 120, and may display an execution screen of the application including the UI screen on the display 110.

Specifically, the processor 130 may display, on the display 110, a UI screen for playing a plurality of contents from a point of time when the playback is stopped based on information on the plurality of applications, information on the plurality of contents, and information on a playback time point when the playback is stopped. The UI screen may be a UI screen for displaying the content played in the application.

Figure 4A:
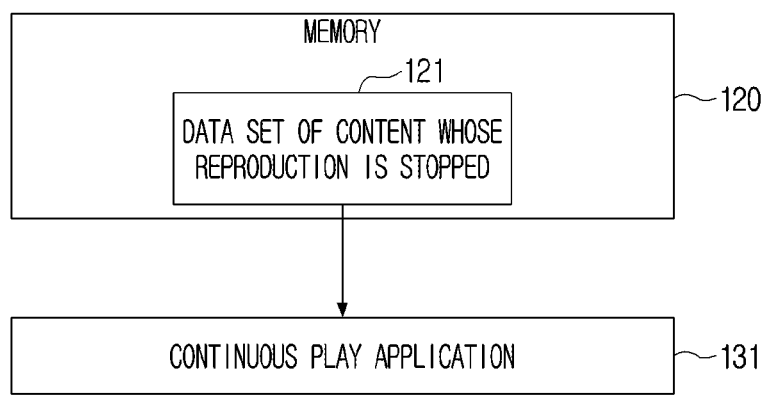

In an embodiment, as illustrated in FIG. 4A, when a continuous play application 131 is executed, the processor 130 may generate a UI screen based on information on a plurality of applications, information on a plurality of contents, and information on a playback time point when the playback is stopped of the data set 121 through the continuous play application, and may display the UI screen on the display 110.

In an embodiment, as illustrated in FIG. 4B, the data set 121 may include information on a name 421 of an application that played content whose playback is stopped, a content ID 422, a playback time point when the playback is stopped 423, a content title 424, and a content image 425.

Figure 4C:
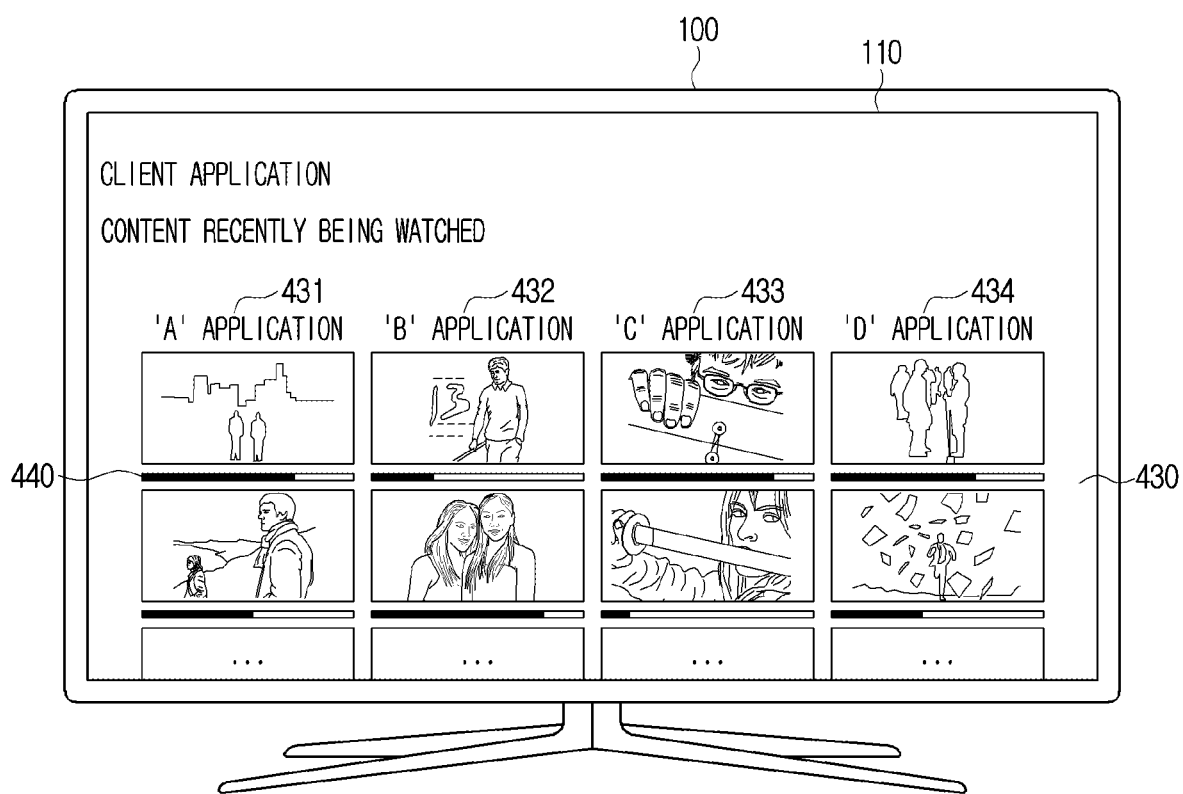

Accordingly, as illustrated in FIG. 4C, a UI screen 430 displayed on the display 110 of the display device 100 by the processor 130 may include a graphic object indicating the name of the application, a thumbnail of the content whose playback is stopped in the application, and the point of time when the playback is stopped for each of the OTT media service applications 431, 432, 433, and 434 (e.g., a graphic object indicating the time when the playback is stopped relative to a total playback time). As shown in FIG. 4C, the point of time when the playback is stopped for particular content may be graphically represented in a progress bar 440 beneath the particular content. In an embodiment, the point of time may be represented numerically or both numerically and in a progress bar.

In an embodiment, when a user command for selecting one of the plurality of contents is input through the UI screen, the processor 130 may execute an application in which the selected content among the plurality of applications is played. In addition, the processor 130 may play the selected content from the point of time when the playback is stopped through the executed application using information on the selected content and information on a playback time point when the playback of the selected content is stopped.

For example, when a user command for selecting content is input through the UI screen, the processor 130 may identify the content selected according to the user command, and execute an application in which the content is played. In addition, the processor 130 may provide information on a content ID of the selected content and a playback time point when the playback of the selected content is stopped to the executed application.

In an embodiment, the application, that is, the OTT media service application, may access a deep link for playing the content from the point of time when the playback is stopped using the information on the content ID and the playback time point when the playback is stopped.

Here, the deep link may refer, for example, to an address or value having a function of executing a specific application or moving to a specific screen within the specific application.

In an embodiment, each of the plurality of applications may be pre-programmed to access a deep link for playing specific content from a point of time when playback of the content is stopped using information on the specific content ID and a playback time point when the playback of the specific content is stopped.

Accordingly, the application may stream and play the content from the point of time when the playback is stopped through the deep link.

Figure 5:
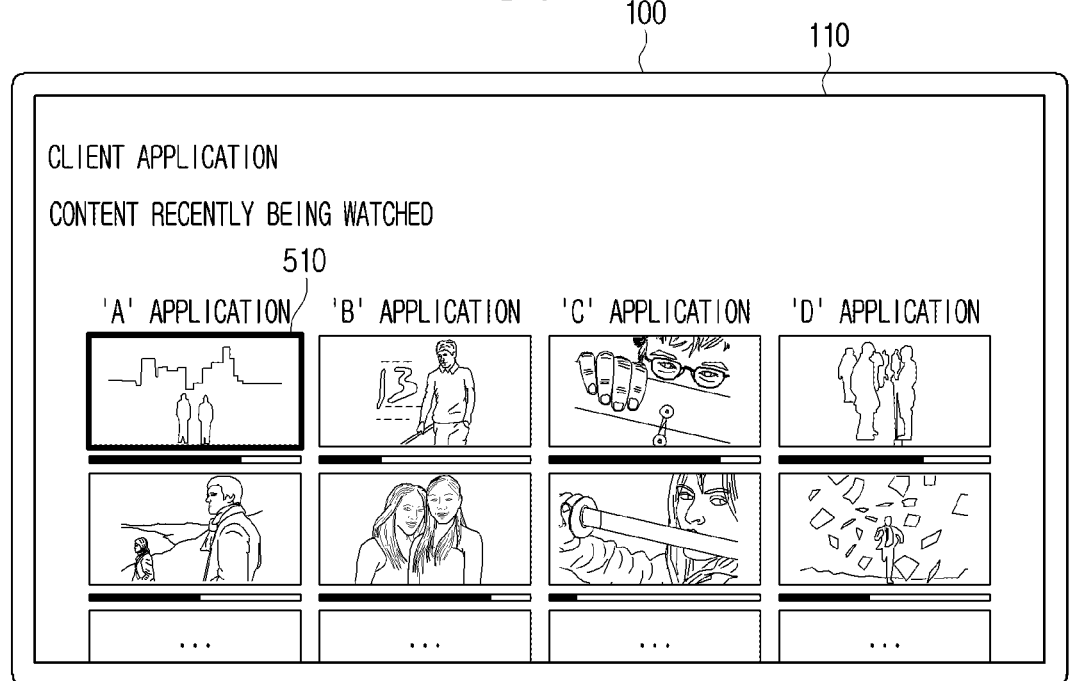
FIG. 5 is a diagram illustrating an example method of playing content from a point of time when playback is stopped through an application according to various embodiments.
Figure 5:
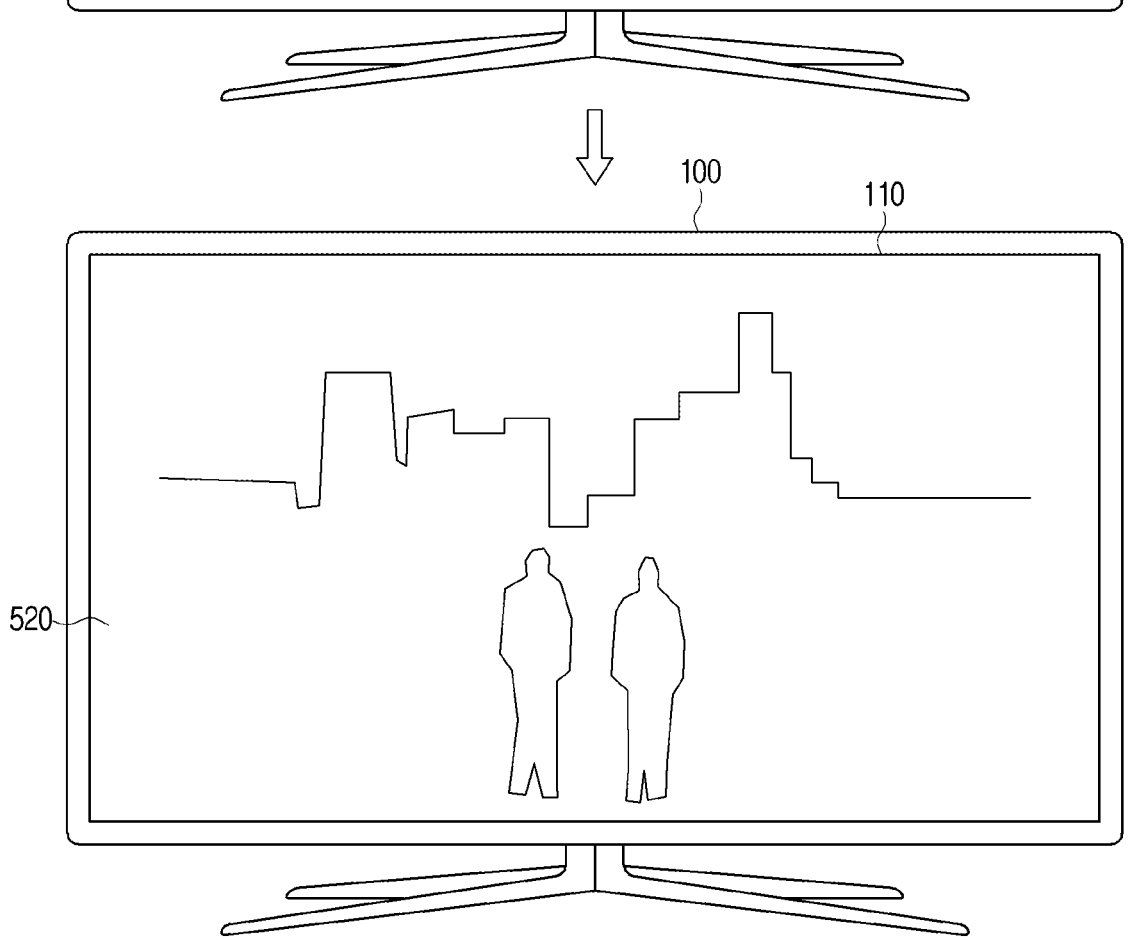

For example, as illustrated in FIG. 5, the user may select a thumbnail 510 of the content played in the application A among the thumbnails of the plurality of contents whose playback is stopped on the UI screen displayed on the display 110 of the display device 100.

In an embodiment, the processor 130 may execute the application A and play content 520 through the application A from the point of time when the playback is stopped.

As described above, according to an embodiment, the display device 100 may display information on the plurality of contents whose playback is stopped in the plurality of applications through one application. Accordingly, the user may easily detect what content he/she has stopped watching, how much he/she has watched the content, and through which application he/she has watched the content, and may receive a continuous play function.

There may be cases in which the content whose playback is stopped may not be continuously played through the application, due to reasons such as deletion of the application that played the content whose playback is stopped, or no longer providing the playback service of the content whose playback is stopped.

According to an embodiment, when the content whose playback is stopped in the plurality of applications is provided through a broadcast channel, the processor 130 may receive the corresponding content from the point of time when the playback is stopped and display the corresponding content through the broadcast channel from the point of time when the playback is stopped.

In an embodiment, the memory 120 may store information on a broadcast schedule. Here, the information on the broadcast schedule may include information on a broadcast time of broadcast contents provided through a plurality of channels. That is, the information on the broadcast schedule may, for example, be electronic program guide (EPG) information, and may be provided by a broadcasting station or the like. In this case, the corresponding information may be stored in a data set 122 of a broadcast schedule of the memory 120.

In addition, the processor 130 may identify a channel that provides content after the point of time when playback is stopped among a plurality of channels based on information on broadcast schedules of the plurality of channels, information on a plurality of contents, and information on a playback time point at which the playback is stopped, and may display a UI screen for displaying content provided from the identified channel on the display 110.

Figure 6A:
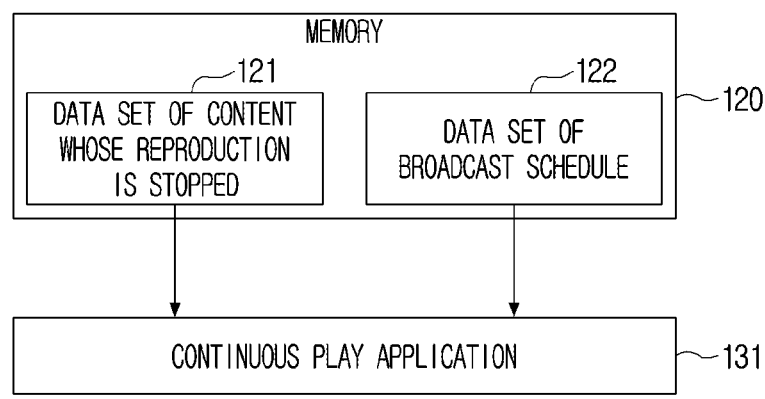
FIGS. 6A, 6B, and 6C are diagrams illustrating an example method of displaying a UI screen for displaying content provided from an identified channel according to various embodiments.

For example, as illustrated in FIG. 6A, when the continuous play application 131 is executed, the processor 130 may generate a UI screen based on the information on the plurality of contents and the information on the playback time point when the playback is stopped of the data set 121, and the information on the broadcast schedule of the plurality of channels of the data set 122 through the continuous play application, and may display the UI screen on the display 110.

The processor 130 may provide the same content as the content whose playback is stopped based on a point of time when an application providing the continuous content playback service is executed, based on the information on the broadcast schedules of the plurality of channels, the information on the plurality of contents, and the information on the playback time point when the playback is stopped. The processor 130 may identify a broadcast channel in which a difference between a current playback time point of the broadcast content and the playback time point of the content whose playback is stopped is less than a preset time.

In an embodiment, the processor 130 may identify the identified broadcast channel as a channel providing content after the point of time when the playback is stopped.

Figure 6B:
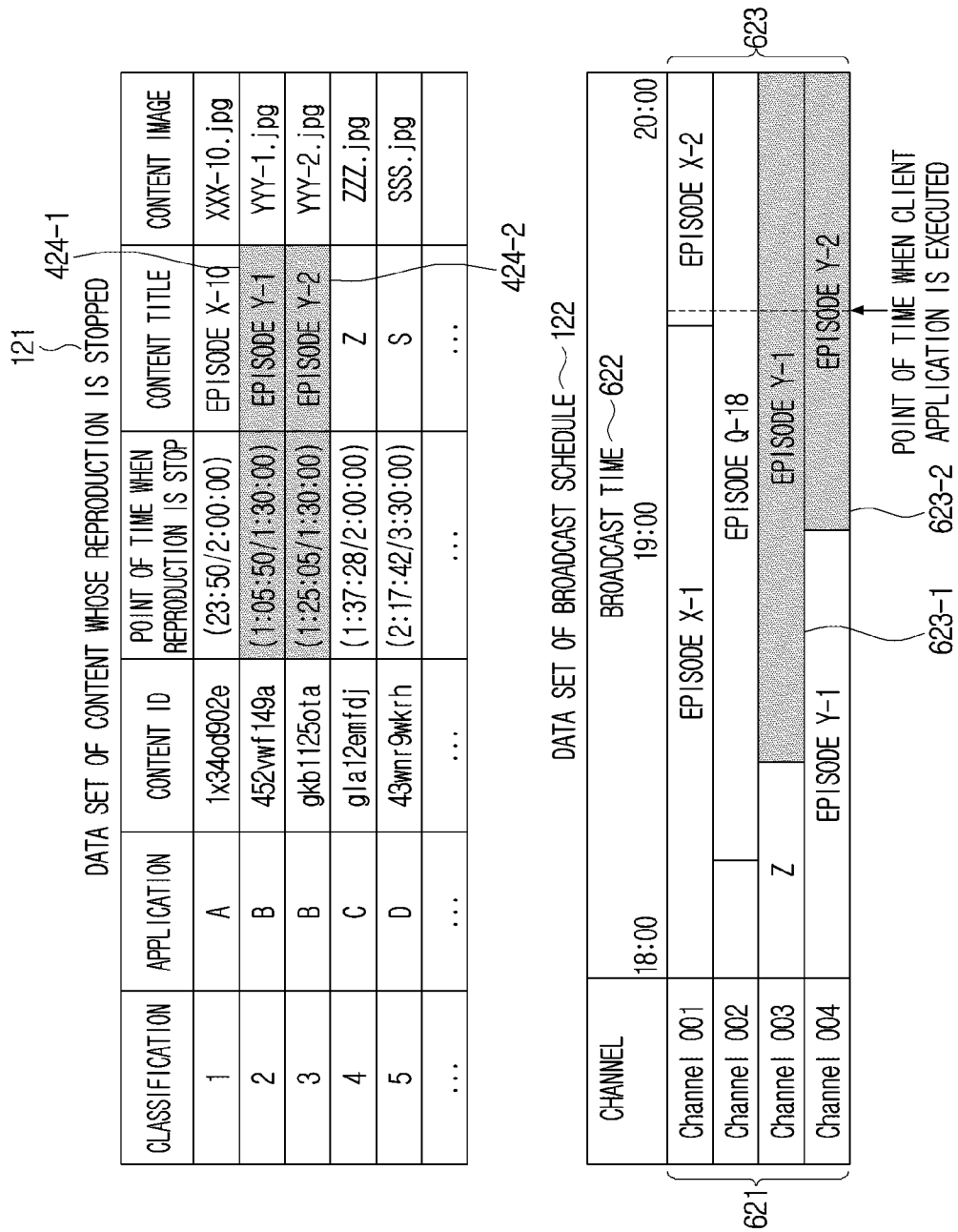

For example, as illustrated in FIG. 6B, the data set 121 of the content whose playback is stopped and the data set 122 of the broadcast schedule are stored in the memory 120. In this case, the data set 122 of the broadcast schedule may include information on a name 621 of a channel, a broadcast time 622, and a name 623 of broadcast content.

In an embodiment, at the point of time at which the continuous play application is executed, content 424-1 of the data set 121 may be the same as the broadcast content 623-1 being broadcast on channel 003 of the data set 122 as an episode Y-1, and content 424-2 of the data set 121 may be same as the broadcast content 623-2 being broadcast on channel 004 of the data set 122 as an episode Y-2.

In an embodiment, at the point of time at which the continuous play application is executed, the playback time point when the playback of the episode Y-1 of the data set 121 is stopped is (1:05:50/1:30:00), and the current playback time point of the episode Y-1 being broadcast on channel 003 of the data set 122 is (1:03:30/1:30:00), and a difference between the two time points is 0:02:20. In addition, when the preset time is set to 0:05:30, the difference between the two time points is less than the preset time, and therefore, the processor 130 may identify the channel 003 of the data set 122 as a channel providing the episode Y-1 after the point of time when the playback is stopped.

On the other hand, the playback time point when the playback of the episode Y-2 of the data set 121 is stopped is (01:25:05/1:30:00), and the current playback time point of the episode Y-2 being broadcast on channel 004 of the data set 122 is (00:30:10/1:30:00), and a difference between the two time points may be 0:54:55. In addition, when the preset time is set to 0:05:30, the difference between the two time points is the preset time or more, and therefore, the processor 130 does not identify the channel 004 of the data set 122 as a channel providing the episode Y-2 after the point of time when the playback is stopped.

In the above example, the preset time is 0:05:30, but the preset time is not limited thereto. In addition, the preset time may be may be changed according to a user's command.

In an embodiment, the processor 130 may display a UI screen for displaying content provided from the identified channel on the display 110.

Figure 6C:
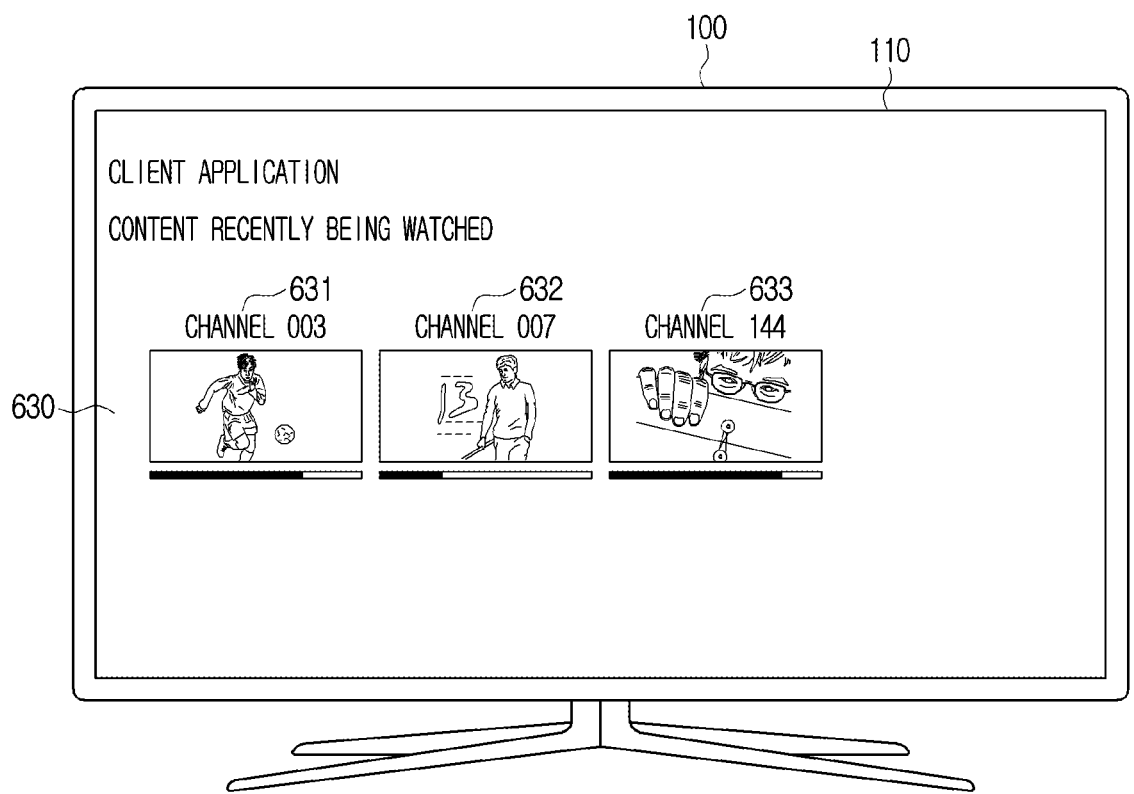

For example, as illustrated in FIG. 6C, a UI screen 630 displayed on the display 110 of the display device 100 by the processor 130 may include the name of the channel, a thumbnail of the content whose playback is stopped in the application, and a graphic object indicating of the point of time (e.g., a progress bar) when the playback is stopped for each of the identified channels 631, 632, and 633.

In an embodiment, when a user command for selecting content is input through the UI screen, the processor 130 may display the content provided through the identified channel on the display 110.

Specifically, the processor 130 may identify the content selected by the user command input through the UI screen. In addition, the processor 130 may receive the selected content through a broadcast receiver (not illustrated) through the channel identified as providing the selected content.

The broadcast receiver (not illustrated) is a component that may receive contents transmitted through a plurality of channels from a broadcasting station. The broadcast receiver (not illustrated) may include a tuner (not illustrated), a demodulator (not illustrated), and a decoder (not illustrated).

In an embodiment, the processor 130 may receive content provided through the identified channel using the broadcast receiver (not illustrated). In addition, the processor 130 may display the content received through the broadcast receiver (not illustrated) on the display 110.

Figure 7:
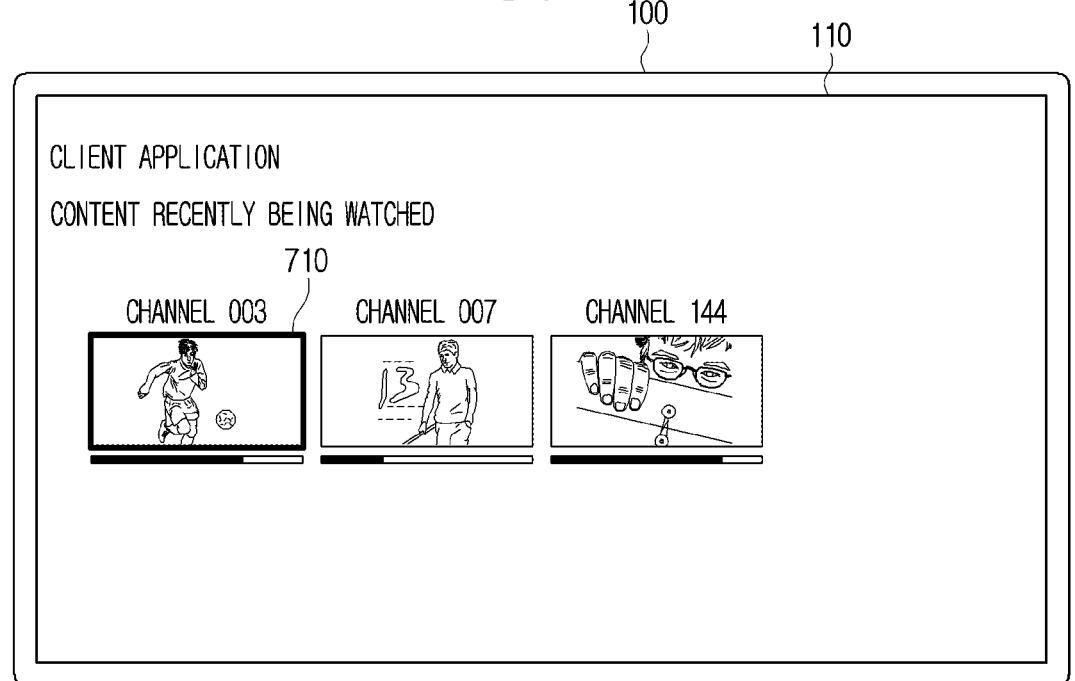
FIG. 7 is a diagram illustrating an example method of displaying content provided through a channel on a display according to various embodiments.
Figure 7:
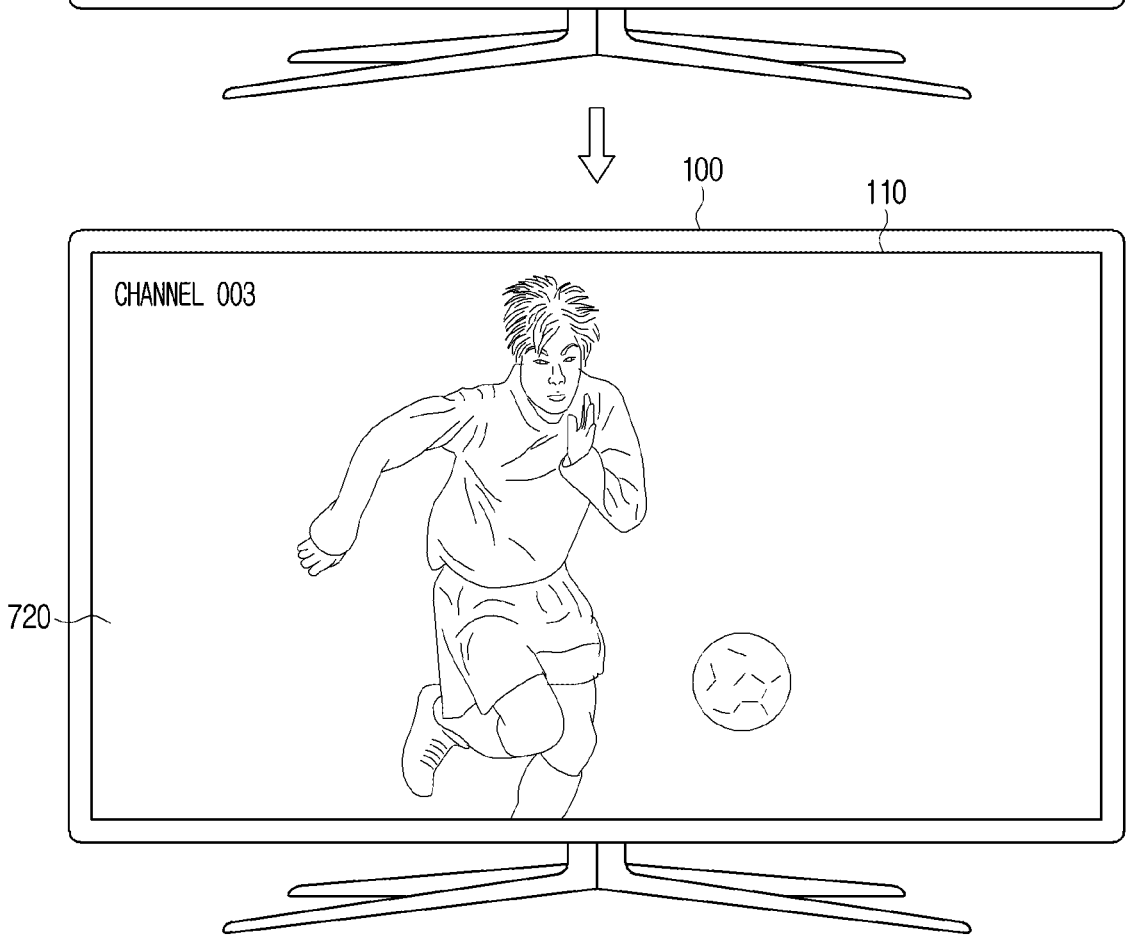

For example, as illustrated in FIG. 7, the user may select a thumbnail 710 of the content provided from the channel 003 among the thumbnails of the plurality of contents whose playback is stopped on the UI screen displayed on the display 110 of the display device 100.

In an embodiment, the processor 130 may display content 720 provided from the channel 003 on the display 110.

As described above, according to an embodiment, through the display device 100, the plurality of contents whose playback is stopped in the application may be continuously watched on the broadcast channel in real time. Accordingly, even when the user may not continue to watch the content whose playback is stopped in the application, the user may continue to watch the content through the broadcast channel.

In the above-described example, it has been described that the UI screen includes only the UI screen for displaying the content played in the application or the UI screen for displaying the content provided from the identified channel. In addition, according to an embodiment, the UI screen may also include both the UI screen for displaying the content played in the application and the UI screen for displaying the content provided from the identified channel.

That is, when the continuous play application is executed, the processor 130 may display the UI screen for displaying the content played in the application and the UI screen for displaying the content provided from the identified channel on the display 110, based on the data set 121 of the content whose playback is stopped and the data set 122 of the broadcast schedule.

Figure 8:
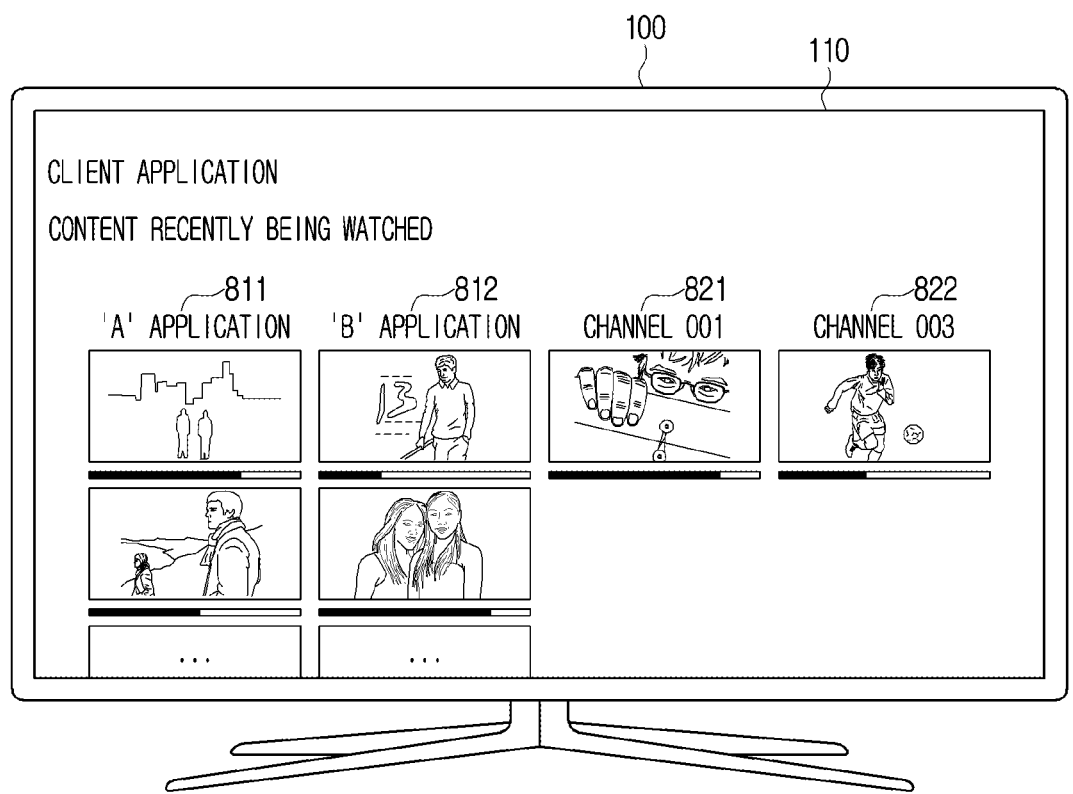
FIG. 8 is a diagram illustrating an example method of displaying a UI screen according to various embodiments.

For example, as illustrated in FIG. 8, the UI screen may include a name of an application, a thumbnail of content whose playback is stopped in an application, and a graphic object indicating of a point of time (e.g., a progress bar) when the playback is stopped for each of the OTT media service applications 811 and 812. In addition, the UI screen may include a name of a channel, a thumbnail of content whose playback is stopped in an application, and a graphic object indicating a point of time (e.g., a progress bar) when the playback is stopped for each of the identified channels 821 and 822.

When a user command for selecting content is input through the UI screen, the processor 130 may play the content selected from the point of time when the playback is stopped through the application, or display the content provided through the identified channel on the display 110.

The above-described embodiments relate to providing the continuous play function of the content whose playback is stopped in the application. However, according to an embodiment, a continuous play function of broadcast content whose display is stopped may also be provided, which will be described in detail below.

In an embodiment, the processor 130 may display broadcast content on the display 110. That is, the processor 130 may display an image of the broadcast content on the display 110. In addition, the processor 130 may output audio of the broadcast content through a speaker of the display device 100.

In an embodiment, the display device 100 may receive the broadcast content through a broadcast receiver (not illustrated) or may be connected to a set-top box and the like to receive terrestrial broadcast, cable broadcast, satellite broadcast, and the like.

Accordingly, when the broadcast content is received, the processor 130 may display the image on the display 110 and output the audio through the speaker of the display device 100.

When a user command for stopping the display of broadcast content is input while the broadcast content provided through the channel is displayed on the display 110, the processor 130 may store information on the broadcast content and information on a watching time of the broadcast content in the memory 120.

The user command for stopping the display of the broadcast content may include various commands for preventing the broadcast content being played from being displayed on the display 110 such as, but not limited to, a command for changing a channel through which broadcast content is provided and a command for turning off the power of the display device 100. The user command may be input in various ways, such as remote control operation, voice recognition, and a touch input to a button provided in the display device 100 or a touch screen included in the display 110.

In an embodiment, when the user command for stopping the display of broadcast content is input, the processor 130 may store the information on the broadcast content and the information on the watching time of the broadcast content in the memory 120.

Here, the information on the broadcast content may include a title of broadcast content, an image of broadcast content, and the like.

Information on the title of broadcast content may include information on the name and episode of the broadcast content. The information on the image of the broadcast content may include URL information of a website that provides a thumbnail image file of the broadcast content or a thumbnail image of the broadcast content.

In an embodiment, the information on the watching time of the broadcast content may include information on the point of time when the display of the broadcast content is stopped. For example, when a total length of the broadcast content is 1 hour and the display thereof is stopped at 30 minutes 20 seconds, the information on the watching time of the broadcast content may include information on a point of time when the display is currently stopped relative to the total length of the broadcast content, for example, (30:20/1:00:00) (=(time when display is stopped/total broadcast time of broadcast content)).

Such information may be acquired from an automatic content recognition (ACR) service server (not illustrated) using ACR technology.

Here, the ACR technology refers, for example, to a technology for extracting image data or audio data included in content, and comparing the extracted data with pre-stored data to identify what kind of content the content is, in order to identify what kind of content the image content is. In this case, the pre-stored data may include all or part of an image frame including specific content and all or part of the audio data including the specific content.

In an embodiment, the processor 130 may transmit the image data displayed on the display 110 and the audio data output through the speaker of the display device 100 to an ACR service server (not illustrated) through a communication interface (not illustrated). In this case, the processor 130 may transmit the image and audio data to the ACR service server (not illustrated) at preset time intervals.

In an embodiment, the display device 100 may include a communication interface (not illustrated) for communication with the ACR service server (not illustrated). In this case, the communication interface (not illustrated) may communicate with the ACR service server through a network using various communication methods such as Wi-Fi, 3G, LTE, and the like.

In an embodiment, the ACR service server (not illustrated) may receive data from the display device 100, analyze the received data through the ACR technology to identify broadcast content displayed on the display device 100, and transmit the name, episode, image, and the like of the identified broadcast content to the display device 100.

The ACR service server (not illustrated) may also acquire information on the watching time of the broadcast content, and transmit the acquired information on the watching time of the broadcast content to the display device 100.

Specifically, the ACR service server (not illustrated) may identify the broadcast content displayed on the display 110 at preset time intervals, and identify a point of time when the display of the identified broadcast content is stopped on the display 110. In addition, the ACR service server (not illustrated) may acquire information on the watching time of the broadcast content based on the identified point of time at which the display is stopped and the information on the broadcast schedule of the broadcast content.

For example, the broadcast content displayed on the display 110 may be identified as A at a specific point of time (e.g., 13:29), and the broadcast content displayed on the display 110 may then be identified as B at a point of time (e.g., 13:30) after a predetermined time interval from the specific point in time.

In this case, the ACR service server (not illustrated) may identify that the display of the broadcast content A is stopped on the display 110 at 13:30. In addition, the ACR service server (not illustrated) may identify the total broadcast time of the broadcast content A based on the information on the broadcast schedule stored in the ACR service server (not illustrated). In this case, as an example, when the total broadcast time of the broadcast content A is from 13:00 to 14:00, the ACR service server (not illustrated) may identify that the display of the broadcast content A on the display 110 is stopped at a point of time when 30 minutes is elapsed since the broadcast content A starts broadcasting.

In an embodiment, the ACR service server (not illustrated) may transmit the acquired information on the watching time of the broadcast content to the display device 100.

In the above-described example, the ACR service server (not illustrated) has been described as using ACR technology to identify the broadcast content displayed on the display 110, but this is an example, and the processor 130 may identify the broadcast content displayed on the display 110 using ACR technology, and also acquire the information on the identified broadcast content and the information on the watching time of the broadcast content. In this case, the processor 130 may, for example, acquire the corresponding information using the ACR technology through an ACR service application.

In addition, the processor 130 may store the acquired information on the broadcast content and information on the watching time of the broadcast content in the memory 120. In this case, the corresponding information may be stored in a data set 123 of broadcast content whose playback is stopped in the memory 120.

Figure 9:
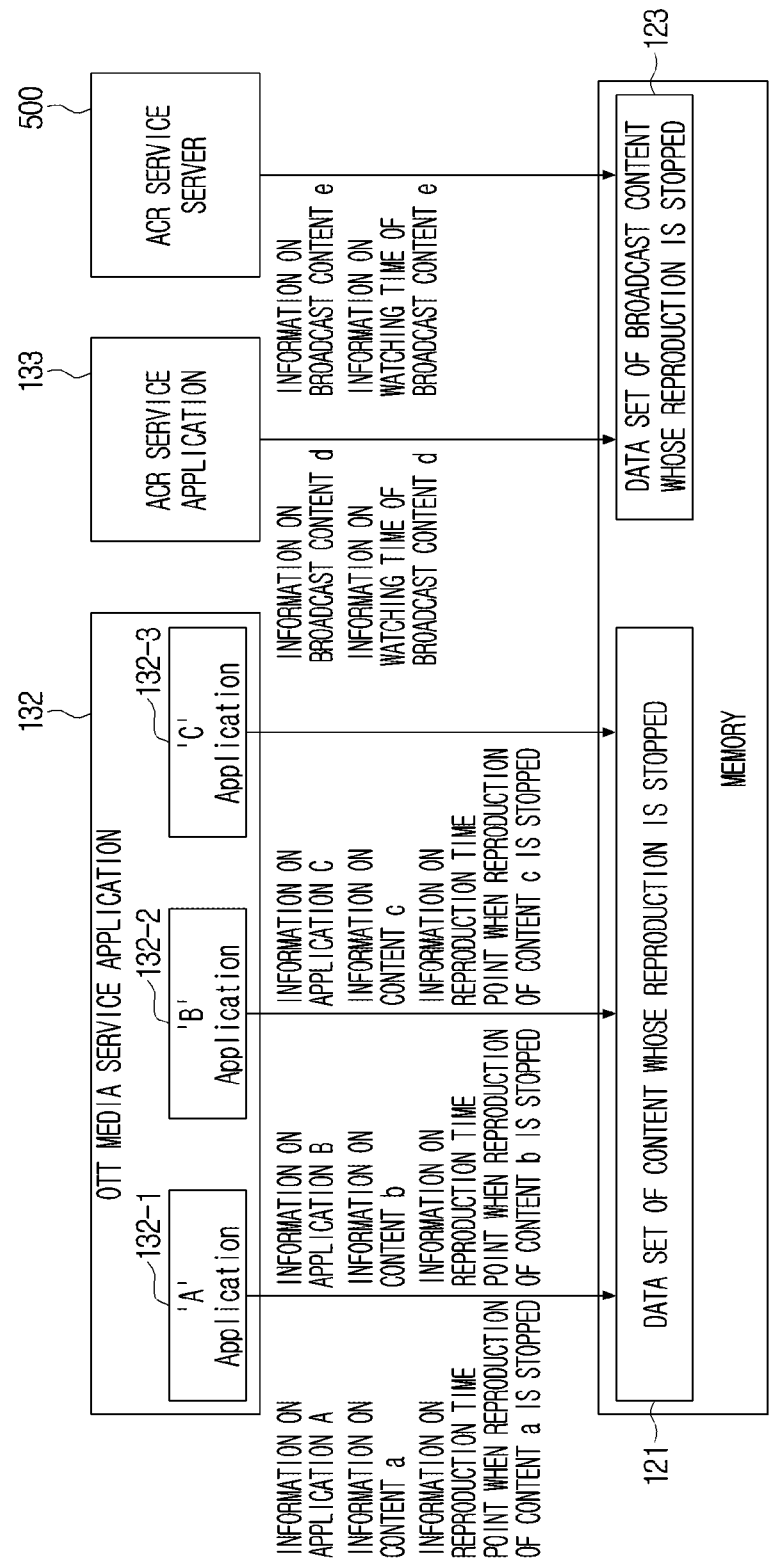
FIG. 9 is a diagram illustrates an example method of storing a broadcast content data set whose playback is stopped according to various embodiments.

For example, as illustrated in FIG. 9, the processor 130 may acquire information on "broadcast content d" and information on a watching time of "the broadcast content d" from the ACR service server 500 and store the acquired information in the data set 123. In addition, the processor 130 may acquire information on "broadcast content e" and information on a watching time of "the broadcast content e" through the ACR service application 133 and store the acquired information in the data set 123.

In an embodiment, when the application 131 that provides the continuous content playback service is executed, the processor 130 may display, on the display 110, a UI screen for providing the broadcast content from the point of time when the playback is stopped based on information on the broadcast content and information on a playback time point when the playback of the broadcast content is stopped.

Specifically, when the application 131 that provides the continuous content playback service is executed, the processor 130 may identify an application providing the broadcast content among the plurality of applications based on information on content provided from each of the plurality of applications and information on the broadcast content.

In an embodiment, the memory 120 may store the information on the content provided from each of the plurality of applications. Here, the information on the content provided from each of the plurality of applications may include information on the content title and the content ID provided from each of the plurality of applications. In addition, the information on the content provided from each of the plurality of applications may be provided from a server that provides the OTT media service. In this case, the corresponding information may be stored in a data set 124 of content provided from an application of the memory 120.

Figure 10A:
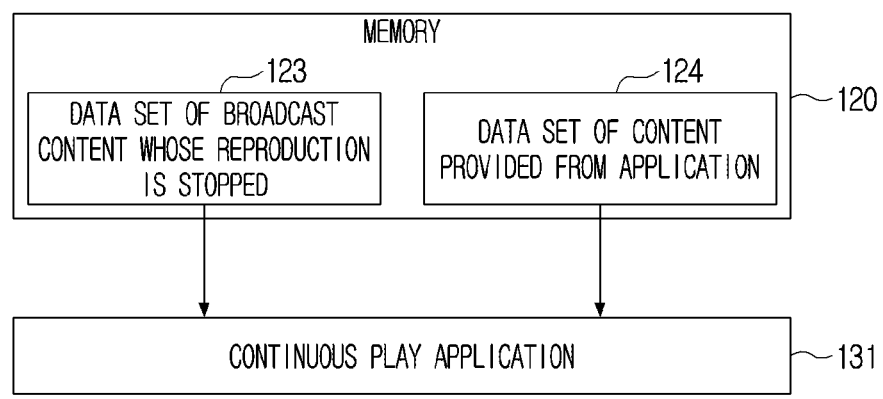

For example, as illustrated in FIG. 10A, when the continuous play application 131 is executed, the processor 130 may generate a UI screen based on information on a plurality of broadcast contents of the data set 123 and information on content provided from each of a plurality of applications of the data set 124 through the continuous play application, and may display the UI screen on the display 110.

In an embodiment, the processor 130 may identify an application in which the same content as the broadcast content whose playback is stopped is in a content providing list based on the information on the content provided from each of the plurality of applications and the information on the broadcast content. In addition, the processor 130 may identify a content ID of the broadcast content whose playback is stopped.

For example, as illustrated in FIG. 10B, the data set 123 of the broadcast content whose playback is stopped and the data set 124 of the content provided from the application are stored in the memory 120. In this case, the data set 124 of the content provided by the application may include information on an application name 1021, a content name 1022, and a content ID.

In an embodiment, broadcast content 1031-1 of the data set 123 may be the same as the content 1022-1 provided from an application A of the data set 124 as an episode Q-1, and broadcast content 1031-2 of the data set 123 may the same as the content 1022-2 provided from an application C as an episode R.

In this case, the processor 130 may identify the application A as an application providing the broadcast content Q-1. In addition, the processor 130 may identify an ID of the content Q-1 provided from the application A of the data set 124 as an ID of the broadcast content Q-1.

In addition, the processor 130 may identify the application C as an application providing the broadcast content R. In addition, the processor 130 may identify an ID of the content R provided from the application C of the data set 124 as an ID of the broadcast content R.

In an embodiment, the processor 130 may display a UI screen including information on the broadcast content provided from the identified application on the display 110.

The UI screen including the information on the broadcast content provided from the identified application is the same as the UI screen for displaying the content played in the application described with reference to FIG. 4C, and a detailed description thereof will not be repeated here.

In an embodiment, when a user command for selecting broadcast content is input through the UI screen, the processor 130 may execute the identified application. In addition, the processor 130 may play the broadcast content after the watching time through the executed application using the information on the watching time of the broadcast content.

For example, when the user command for selecting the broadcast content is input through the UI screen, the processor 130 may identify the broadcast content selected according to the user command and execute the application identified as providing the broadcast content. In addition, the processor 130 may provide information on an ID of the selected broadcast content and a point of time when the watching of the selected broadcast content is stopped to the executed application.

In an embodiment, the executed application may stream and play the broadcast content from the point of time when the display is stopped through a deep link. A method of streaming and playing the broadcast content through a deep link by the application is the same as the method of streaming and playing the content through the deep link by the application described above, and a detailed description thereof will not be repeated here. As described above, according to an embodiment, the display device 100 may continuously play the broadcast content whose playback is stopped through the application. Accordingly, the user may continue to watch the broadcast content whose playback is stopped when he/she wants, regardless of the broadcast time of the broadcast content whose playback is stopped.

There may be cases in which the broadcast content may not be played through the application due to reasons such as the broadcast content whose display is stopped is not in the content list provided by the application.

Accordingly, according to an embodiment, when the broadcast content whose watching is stopped is provided through a broadcast channel, the processor 130 may receive and display the broadcast content whose watching is stopped through the broadcast channel.

When the application that provides the continuous content playback service is executed, the processor 130 may identify a channel providing the broadcast content after the watching time among the plurality of channels based on information on broadcast schedules of the plurality of channels, information on the broadcast content, and information on a playback time point when the playback of the broadcast content is stopped.

In an embodiment, the processor 130 may identify the channel that provides the content after the watching time among the plurality of channels based on the information on the broadcast schedules of the plurality of channels, the information on the broadcast content, and the information on the watching time of the broadcast content, and may display a UI screen including information broadcast content provided from the identified channel on the display 110.

Figure 11:
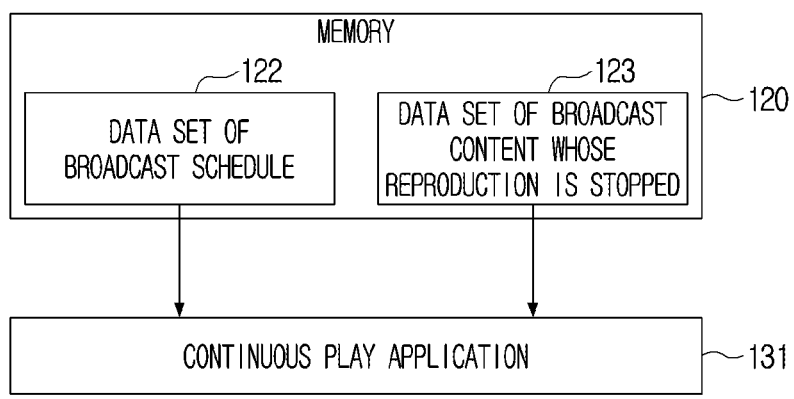
FIG. 11 is a diagram illustrating an example method of displaying a UI screen including information on broadcast content provided on an identified channel according to various embodiments.

For example, as illustrated in FIG. 11, when the continuous play application 131 is executed, the processor 130 may generate a UI screen based on information on the broadcast schedules of the plurality of channels of the data set 122 and information on the broadcast content of the data set 123, and may display the UI screen on the display 110.

In an embodiment, the processor 130 may provide the same broadcast content as the broadcast content whose display is stopped based on a point of time when the application providing the continuous content playback service is executed, based on the information on the broadcast schedules of the plurality of channels, the information on the broadcast content, and the information on the watching time of the broadcast content, and may identify a broadcast channel in which a difference between a current playback time point of the broadcast content and a display stop time point of the broadcast content whose display is stopped is less than a preset time.

In addition, the processor 130 may identify the identified channel as a channel providing the broadcast content after the watching time.

A method of identifying the channel providing the broadcast content after the watching time is the same as the method of identifying the channel providing the content after the point of time when the playback is stopped with reference to FIG. 6B, and a detailed description thereof will not be repeated here.

In addition, the processor 130 may display a UI screen including information on the broadcast content provided from the identified channel on the display 110.

In addition, when a user command for selecting broadcast content is input through the UI screen, the processor 130 may display broadcast content provided through the identified channel on the display 110.

A method in which the processor 130 displays the UI screen including the information on the broadcast content provided from the identified channel on the display 110, and a method in which the processor 130 displays the broadcast content provided through the identified channel on the display 110 are the same as the method of displaying the UI screen including the identified content on the display and the method of displaying the content provided through the identified channel on the display 110 described above with reference to FIGS. 6C and 7, and a detailed description thereof will not be repeated here.

As described above, according to an embodiment, the display device 100 may identify a channel that is broadcasting the broadcast content whose playback is stopped, and may continuously play the broadcast content whose playback is stopped on the identified channel. Accordingly, the user may continue to watch the broadcast content from the point of time when the playback is stopped without directly finding the broadcast schedule.

In an above-described example embodiment, it has been described that the processor 130 displays, on the display 110, the UI screen for playing the content from the point of time when the playback is stopped based on the data set 121 of the content whose playback is stopped, or displays, on the display 110, the UI screen for providing the broadcast content after the watching time based on the data set 123 of the broadcast content whose playback is stopped, but this is only an example. That is, the processor 130 may also display, on the display 110, the UI screen for playing the content from the point of time when the playback is stopped and the UI screen for providing the broadcast content after the watching time based on the data set 121 and the data set 123.

Figure 12:
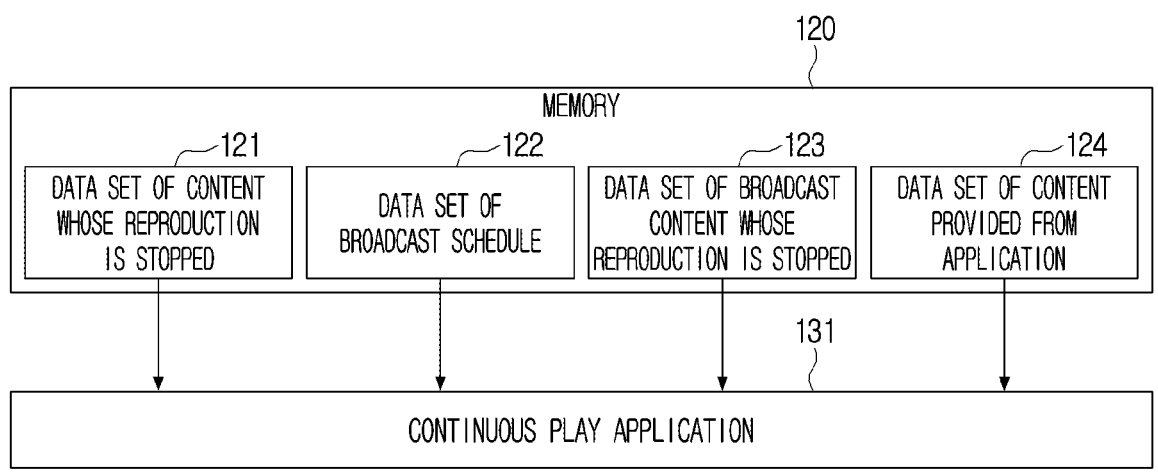
FIG. 12 is a diagram illustrating aspects of an example method of displaying a UI screen according to various embodiments.

In an embodiment, as illustrated in FIG. 12, when the continuous play application 131 is executed, the processor 130 may generate the UI screen for playing the content from the point of time when the playback is stopped and the UI screen for providing the broadcast content after the watching time based on a combination of the data set 121 of the content whose playback is stopped, the data set 122 of the broadcast schedule, the data set 123 of the broadcast content whose playback is stopped, and the data set 124 of the content provided from the application through the continuous play application, and may display the UI screens on the display 110.

A method of the generating and displaying the UI screen for playing the content from the point of time when the playback is stopped and the UI screen for providing the broadcast content after the watching time has been described above, and thus, a detailed description thereof will not be repeated here.

In an embodiment, the display device 100 may display, on the display 110, the UI screen for playing the content from the point of time when the playback is stopped or the UI screen for providing the broadcast content after the watching time based on information received from a server (not illustrated).

Here, the server (not illustrated) may store information on content and broadcast content watched on at least one display device linked to a user account, and may provide information on recommended content to at least one display device linked to the user account based on the stored information.

In an embodiment, the user of the display device 100 may link the display device 100 with the server (not illustrated). Specifically, the user of the display device 100 may link the display device 100 with the server (not illustrated) by registering his or her account in the display device 100. In this case, the processor 130 may communicate with the server (not illustrated) through a communication interface.

Accordingly, the processor 130 may transmit various pieces of information about the display device 100 to the server (not illustrated) through the communication interface.

For example, when the playback of the plurality of contents played through the plurality of applications is stopped, the processor 130 may transmit information on the plurality of applications, information on the plurality of contents, and information on a playback time point at which playback is stopped to the server (not illustrated) through the communication interface (not illustrated).

In an embodiment, when a user command for stopping the display of broadcast content is input while the broadcast content provided through the channel is displayed on the display 110, the processor 130 may transmit information on the broadcast content and information on a watching time of the broadcast content to the server (not illustrated) through the communication interface (not illustrated).

In an embodiment, when the application that provides the continuous content playback service is executed on the display device 100, the server (not illustrated) may transmit information for generating the UI screen for playing the content from the point of time when the playback is stopped or the UI screen for providing the broadcast content after the watching time based on the received information, the information on the broadcast schedules of the plurality of channels, and the information on the content provided from each of the plurality of applications to the display device 100. In this case, the information on the broadcast schedules of the plurality of channels and the information on the content provided from each of the plurality of applications may be information previously stored in the server (not illustrated) or information received from the display device 100.

In an embodiment, the processor 130 may generate a UI screen for playing the content from the point of time when the playback is stopped and a UI screen for providing the broadcast content after the watching time based on the received information, and may display the UI screens on the display 110.

In an embodiment, when a user command for selecting one of the plurality of contents or broadcast contents is input through the UI screen, the processor 130 may provide the selected content or broadcast content through an application or through a channel.

As described above, because the display device 100 according to an embodiment may provide a continuous content playback service based on the information received from a user's account server, the user of the display device 100 may continue to watch content or broadcast content that has stopped watching on another display device on the display device 100.

Figure 13:
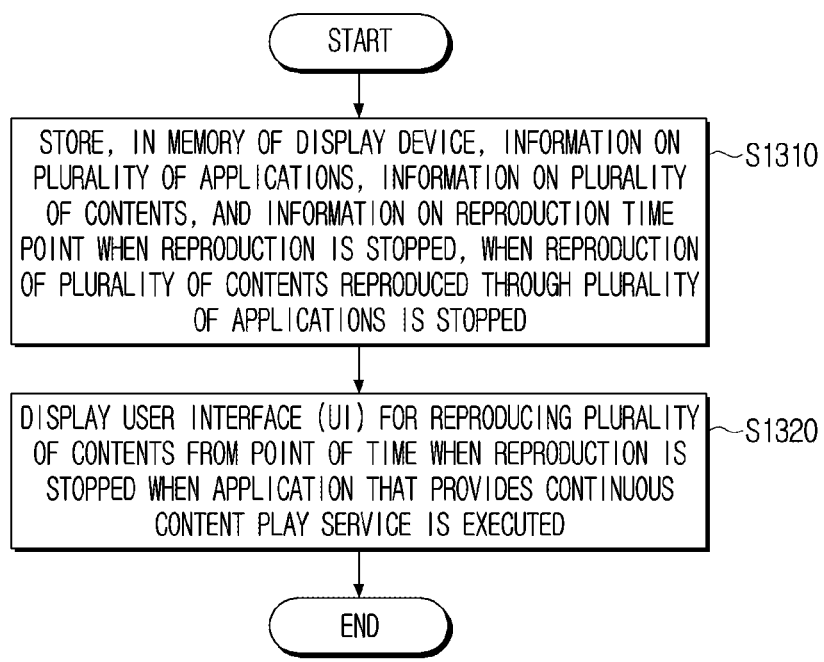
FIG. 13 is a flowchart illustrating an example controlling method of a display device according to various embodiments.

FIG. 13 is a flowchart illustrating an example controlling method of a display device according to various embodiments.

First, when playback of a plurality of contents played through a plurality of applications is stopped, information on the plurality of applications, information on the plurality of contents, and information on a playback time point at which the playback is stopped are stored in a memory of a display device (S1310).

In this case, each of the plurality of applications may be an application that provides a service for streaming content stored in a server to the display device through an Internet network.

Meanwhile, in step S1310, when a user command for stopping a display of broadcast content is input while the broadcast content provided through a channel is displayed, information on the broadcast content and information on a watching time of the broadcast content may be stored in the memory.

In an embodiment, when the application that provides the continuous content playback service is executed, a user interface (UI) screen for playing the plurality of contents from a point of time when the playback is stopped using the information stored in the memory is displayed (S1320).

In step S1320, when the application that provides the continuous content playback service is executed, a UI screen for providing broadcast content after a watching time based on the information on the broadcast content and the information on the watching time of the broadcast content may be displayed.

In this case, step S1320 includes identifying an application providing the broadcast content among the plurality of applications based on the information on the content provided from each of the plurality of applications and the information on the broadcast content when the application that provides continuous content playback service is executed, and displaying a UI screen including information on the broadcast content provided from the identified application. The controlling method may include executing the identified application and playing the broadcast content after the watching time through the executed application using the information on the watching time of the broadcast content, when a user command for selecting the broadcast content is input the UI screen.

In addition, step S1320 includes identifying a channel providing broadcast content after a watching time among a plurality of channels based on information on broadcast schedules of the plurality of channels, information on the broadcast content, and information on the watch time of the broadcast content when the application that provides continuous content playback service is executed, and displaying a UI screen including information on the broadcast content provided from the identified channel, and the controlling method may include displaying the broadcast content provided through the identified channel when a user command for selecting the broadcast content is input the UI screen.

Meanwhile, step S1320 may include identifying a channel that provides content after a point of time when playback is stopped among a plurality of channels based on the information on the broadcast schedules of the plurality of channels, the information on the plurality of contents, and the information on the playback time point at which the playback is stopped, and displaying a UI screen for displaying content provided from the identified channel.

In this case, step S1320 may include displaying a UI screen including information on the identified channel, and the controlling method may include displaying content provided through the identified channel when a user command for selecting the content is input through the UI screen.

A method of displaying a UI screen and a method of playing the content whose playback is stopped or displaying the broadcast content have been described above. Accordingly, the convenience of the user may be increased in that the user may easily continue to watch the content or broadcast content whose playback is stopped through the application or the broadcast channel.

Figure 14:
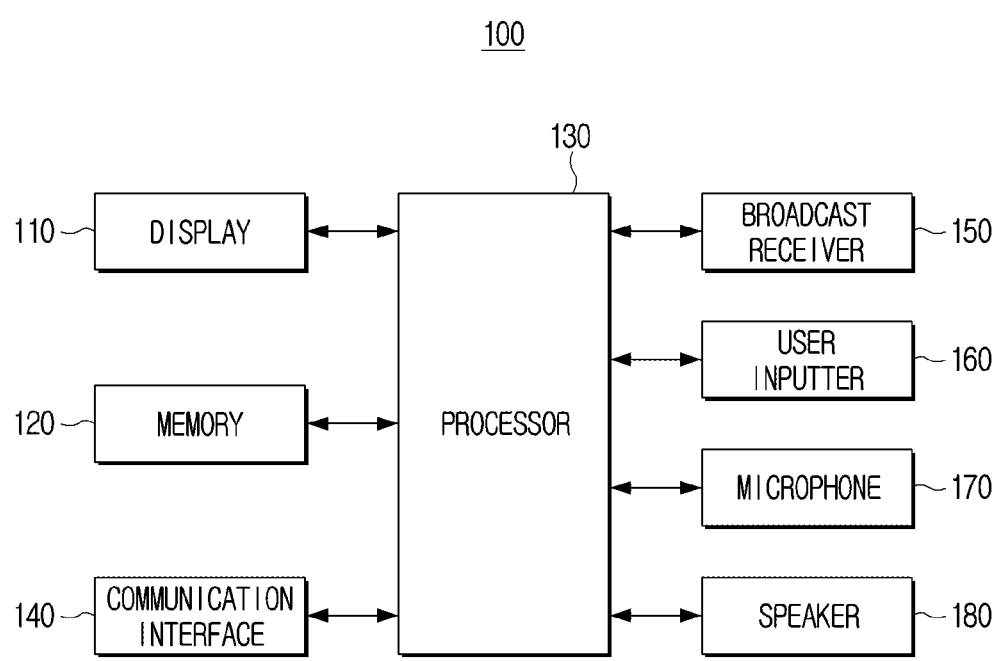
FIG. 14 is a block diagram illustrating a detailed configuration of an example display device according to various embodiments.

FIG. 14 is a block diagram illustrating a detailed configuration of an example display device according to various embodiments.

Referring to FIG. 14, the display device 100 may include a display 110, a memory 120, a communication interface 140, a broadcast receiver 150, a user inputter 160, a microphone 170, and a speaker 180. The components of display device 100 illustrated in FIG. 14 are only examples, and at least some of the components may be omitted or other components may be added according to various embodiments.

The display 110, the memory 120, and the processor 130 have been described with reference to FIGS. 1 to 13, and thus, a detailed description of overlapping parts will not be repeated here.

The communication interface 140 (e.g., including communication circuitry) is a component for performing communication with external devices. The processor 130 may transmit various data to the external device through the communication interface 140 and receive various data from the external device.

For example, the communication interface 140 may communicate with various external devices through a wireless communication method such as Bluetooth (BT), Bluetooth low energy (BLE), wireless fidelity (WI-FI), and Zigbee, or infrared (IR) communication method. The communication interface 140 may be mounted on the processor 130, and may also be included in the display device 100 as a component separate from the processor 130.

The processor 130 may receive information on content stored in the external device through the communication interface 140. In addition, the processor 130 may play the content stored in the external device through the display 110 or the speaker 180 based on the received information.

The broadcast receiver 150 is a component that may receive a broadcast signal from a broadcasting station 400. For example, the processor 130 may receive the broadcast signal through the broadcast receiver 150 and play content provided through a broadcast channel through the display 110 or the speaker 180.

The user inputter 160 (e.g., including input circuitry) is a component for receiving various user commands. For example, the user inputter 160 may include a touch panel and the like, and may also include a remote control signal receiver to receive various user commands from a remote control for controlling the display device 100.

In this case, the processor 130 may control other components to execute various functions according to the user command input to the user inputter 160. For example, the processor 130 may execute an application that provides the continuous content playback service based on a command executed by the application that provides the continuous content playback service input through the user inputter 160.

The processor 130 may play selected content through an application or display the selected content on the display 110 through a channel based on a command for selecting content or broadcast content displayed on a UI screen which is input to the user inputter 160.

The microphone 170 may receive a voice. Here, the voice may include a user command for controlling an operation of the display device 100. In this case, the processor 130 may recognize a voice input through the microphone 170, and control various components of the display device 100 according to the recognized voice.

When a user command for playing content whose playback is stopped is received through the microphone 170, the processor 130 may play the content whose playback is stopped through the application or display the content whose playback is stopped on the display 110 through the channel.

The speaker 180 may output an audio signal. Specifically, when the content includes an audio signal, the processor 130 may output the audio signal of the content through the speaker 180.

According to an embodiment, the various embodiments described hereinabove may be implemented by software including instructions that are stored in machine (e.g., a computer)-readable storage media. The machine is an apparatus that invokes the stored instructions from the storage media and is operable according to the invoked instructions, and may include the machine according to the disclosed embodiments. When the commands are executed by the processor, the processor may perform functions corresponding to the commands, either directly or using other components under the control of the processor. The commands may include codes generated or executed by a compiler or an interpreter. The machine readable storage medium may be provided in the form of non-transitory storage medium. Here, the term "non-transitory storage medium" simply refers to, for example, a storage medium that is a tangible device and may not contain signals (e.g., electromagnetic waves), and such a term does not distinguish between a case in which data is stored semi-permanently in the storage medium and a case in which data is temporarily stored in the storage medium. For example, the "non-transitory storage medium" may include a buffer in which the data is temporarily stored.

According to an embodiment, the method according to the various embodiments disclosed in the disclosure may be included and provided in a computer program product. The computer program product may be traded as a product between a seller and a purchaser. The computer program product may be distributed in the form of a machine-readable storage medium (e.g., compact disc read only memory (CD-ROM)), or may be distributed (e.g., downloaded or uploaded) online, through an application store (e.g., Play Store™) or directly between two user devices (e.g., smartphones). In the case of the online distribution, at least a portion of the computer program product (e.g., a downloadable app) may be at least temporarily stored in a machine readable storage medium such as a memory of a server of a manufacturer, a server of an application store, or a relay server, or may be temporarily generated.

Although the embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. A display device comprising:
 a display;
 memory; and
 at least one processor comprising processing circuitry configured to individually or collectively execute instructions stored in the memory to cause the display device to perform operations comprising:
  for each of a plurality of contents for which viewing is stopped, storing, in the memory, stopped content information including information on the content, and information on a stopping point of the viewing,
  identifying a channel providing broadcast content among a plurality of channels based on the stopped content information and broadcast schedule information;
  displaying, on the display, a user interface (UI) screen comprising one or more screen objects for stopped contents, the one or more screen objects including a first screen object for broadcast content provided by the identified channel;
  receiving an input to the display device for selecting one of the one or more screen objects; and
  based on the selected screen object corresponding to the first screen object, displaying the broadcast content provided through the identified channel on the display.

2. The display device as claimed in claim 1, wherein the identified channel provides content after the stopping point.

3. A method of controlling a display device, the method comprising:
 for each of a plurality of contents for which viewing is stopped, storing, in a memory of the display device, stopped content information including information on the content and information on a stopping point of the viewing,
 identifying a channel providing broadcast content among a plurality of channels based on the stopped content information and broadcast schedule information,
 displaying, on a display of the display device, a user interface (UI) screen comprising one or more screen objects for stopped contents, the one or more screen objects including a first screen object for broadcast content provided by the identified channel,
 receiving an input to the display device for selecting one of the one or more screen objects, and
 based on the selected screen object corresponding to the first screen object, displaying the broadcast content provided through the identified channel on the display.

4. The method as claimed in claim 3, wherein the identified channel provides content after the stopping point.

5. One or more non-transitory computer-readable storage media storing instructions which, when executed by at least one processor of an electronic device, cause the electronic device to perform operations comprising:
 for each of a plurality of contents for which viewing is stopped, storing, in a memory of the electronic device, stopped content information including information on the content and information on a stopping point of the viewing,
 identifying a channel providing broadcast content among a plurality of channels based on the stopped content information and broadcast schedule information,
 displaying, on a display of the electronic device, a user interface (UI) screen comprising one or more screen objects for stopped contents, the one or more screen objects including a first screen object for broadcast content provided by the identified channel,
 receiving an input to the electronic device for selecting one of the one or more screen objects, and
 based on the selected screen object corresponding to the first screen object, displaying the broadcast content provided through the identified channel on the display.

* * * * *